US006560654B1

(12) United States Patent
Fedyk et al.

(10) Patent No.: US 6,560,654 B1
(45) Date of Patent: May 6, 2003

(54) APPARATUS AND METHOD OF MAINTAINING TIMELY TOPOLOGY DATA WITHIN A LINK STATE ROUTING NETWORK

(75) Inventors: Donald Fedyk, Groton, MA (US); Peter Ashwood-Smith, Hull (CA); Jerzy Miernik, Allen, TX (US); Keith Dysart, Stittsville (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/417,155

(22) Filed: Oct. 12, 1999

(51) Int. Cl.[7] .............................................. G06F 13/00
(52) U.S. Cl. ...................... 709/239; 709/235; 709/242; 370/238
(58) Field of Search ................................ 709/230, 232, 709/235, 236, 237, 238, 239, 242, 243, 249; 370/235, 237, 238, 351, 395

(56) References Cited

U.S. PATENT DOCUMENTS

| | | | | |
|---|---|---|---|---|
| 5,463,620 A | * | 10/1995 | Sriram | 370/60 |
| 5,675,577 A | * | 10/1997 | Komatsu | 370/237 |
| 5,933,422 A | * | 8/1999 | Kusano et al. | 370/331 |
| 6,084,858 A | * | 7/2000 | Matthews et al. | 370/238 |
| 6,256,309 B1 | * | 7/2001 | Daley et al. | 370/395 |
| 6,363,319 B1 | * | 3/2002 | Hsu | 701/202 |

OTHER PUBLICATIONS

Rosen et al., "Multiprotocol Label Switching Architecture," Network Working Group, IETF Internet Draft, pp. 1–62, Aug. 1999.

Unknown, "PNNI Routing Description," ATM Forum Technical Committee, pp. 15–17, 40–45, 203–206, 240, and 246–247, Mar. 1996.

Spiegel et al., "An Alternate Path Routing Scheme Supporting QOS and Fast Connection Setup in ATM Networks," Proceedings of the Global Telecommunication Conference (Globecom), IEEE, pp. 1224–1230, 1994.

* cited by examiner

Primary Examiner—Viet D. Vu
(74) Attorney, Agent, or Firm—Steubing McGuinness & Manaras LLP (57) ABSTRACT

An apparatus and method of forwarding a first message from a source to a destination via a link state routing network utilizes point-to-point feedback messages when the quality of a first path from the source to the destination meets some prescribed condition. To that end, the first path is initialized within the link state routing network. A feedback message having data relating to a quality of the first path then is received as a point-to-point message that is forwarded to the source. In response to receipt of the feedback message, a second path is initialized from the source to the destination. The first message then is forwarded to the destination via the second path.

64 Claims, 4 Drawing Sheets

APPARATUS AND METHOD OF MAINTAINING TIMELY TOPOLOGY DATA WITHIN A LINK STATE ROUTING NETWORK

FIELD OF THE INVENTION

The invention generally relates to computer networks and, more particularly, the invention relates to an apparatus and method for managing message traffic in a link state routing network.

BACKGROUND OF THE INVENTION

Multi-protocol label switching ("MPLS") is a path oriented routing protocol that integrates layer two data link layer (e.g., bandwidth, latency, and utilization) into ISO layer three network layer to simplify and improve packet exchange. More particularly, the data link layer manages packet transportation, while the network layer determines the destination of packets. MPLS achieves these objectives by setting the layer two forwarding tables to meet the layer three requirements.

Layer three networking with MPLS can utilize several families of routing protocols to automatically distribute routing information. One such family of routing protocols, known in the art as "link state routing protocols", offers a number of advantages. Among those advantages is rapid convergence time when the network changes, and the distribution of complete network information within a given routing domain. Accordingly, MPLS can be implemented across a link state routing network.

Network information (i.e., link information) in a link state network is distributed to active nodes in a given routing domain by a reliable flood of link state advertisements ("LSAs"). LSAs may be broadcasted to active nodes each time a bandwidth allocation changes across a link, or each time a link malfunctions (i.e., a link "goes down"). In addition, LSAs also may be broadcasted once every preselected time interval, such as once every thirty minutes.

There are instances, however, when LSAs unnecessarily reduce network bandwidth. Specifically, the group of network devices receiving a broadcast of an LSA often includes network devices that are not within a given path requiring the data in the LSA, and network devices that do not execute the MPLS protocol. Use of a broadcast therefore can unnecessarily utilize bandwidth by synchronously and/or asynchronously broadcasting LSAs to network devices that do not utilize such advertisements. Stated another way, many devices that do not require use of LSAs nevertheless receive LSAs. Moreover, use of flooding to transport network information can ultimately limit the size of a network, and often does not provide a timely update of topology information.

SUMMARY OF THE INVENTION

In accordance with one aspect of the invention, an apparatus and method of forwarding a first message from a source to a destination via a link state routing network utilizes point-to-point feedback messages when the quality of a first path from the source to the destination meets some prescribed condition. Accordingly, reliance upon LSAs is reduced. To that end, the first path is initialized within the link state routing network. A feedback message having data relating to a quality of the first path then is received as a point-to-point message that is forwarded to the source. In response to receipt of the feedback message, a second path is initialized from the source to the destination. The first message then is forwarded to the destination via the second path.

It should be noted that although first and second paths are discussed, such paths are not necessarily the first and second paths that are initialized. Prior paths may have been unsuccessfully initialized.

In preferred embodiments, the feedback message includes failure data indicating that the bandwidth along the first path is below a preselected amount. Moreover, the quality of the first path may include data relating to various aspects of the path, such as available bandwidth or quality of service of the first path. The first path may include a plurality of nodes that forward the feedback message to no network devices other than the source, or other network devices that are configured to forward the feedback message toward the source. The source may include a database that is updated in response to receipt of the feedback message. The database thus may be out of synchronization with the other nodes once it is updated. In many embodiments, the first message may comprise s stream of path oriented packets.

In some embodiments, the link state routing network produces broadcast advertisements (i.e., in contrast to the non-broadcast, point-to-point feedback message). Accordingly, when a broadcast advertisement is received by the source, it overwrites the stored data in the local data storage (i.e., from the feedback message, if any) with advertisement data in the broadcast advertisement. As a result of this overwriting process, the source is synchronized with the other nodes in the network. The first path may be initialized in a conventional manner, such as by forwarding label information to a plurality of nodes that are to forward the first message from the source to the destination. The first message preferably is forwarded from the source across data networks that may be either or both connectionless oriented and connection oriented networks. In preferred embodiments, the network implements MPLS.

In accordance with another aspect of the invention, an apparatus and method of forwarding a first message from a source to a destination via a link state routing network similarly uses point-to-point feedback messages. The link state routing network utilizes broadcast advertisements to notify network devices of bandwidth allocation in the link state network. The apparatus and method thus initialize a first path from the destination to the source, and set a minimum bandwidth for the first message to be forwarded through the first path. The source then receives a feedback message having data indicating that the first path has a bandwidth that is below the minimum bandwidth. As noted above, the feedback message is a point-to-point message forwarded toward the source. In response to receipt of the feedback message, a second path from the source to the destination is initialized, and the first message is forwarded to the destination via the second path.

Preferred embodiments of the invention are implemented in hardware, or as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

In accordance with preferred embodiments of the invention, an apparatus and method for establishing data transmission paths (a/k/a routes, channels, etc. . .) across a link state routing network generates and forwards point-to-point feedback messages to a source network device (i.e., a network device attempting to establish the path) indicating whether the path has at least a minimum amount of bandwidth to transmit data. If the path does have the minimum amount of bandwidth, then it is used to transmit the desired data. If the path does not have the minimum amount of bandwidth, however, then another path is established to transmit the data. Among other types, such data may include time sensitive data, including streaming voice and streaming video data.

The preferred apparatus and method may be used with any link state routing network, such as one that utilizes the well known multi-protocol label switching algorithm (MPLS). Although preferred embodiments are discussed with reference to MPLS, however, discussion of MPLS is not intended to limit the scope of the invention. Accordingly, principles of preferred embodiments may be applied to link state routing networks utilizing other similar protocols. For example, in addition to MPLS, preferred embodiments may be utilized with link state routing networks utilizing other interior gateway protocols ("IGP"), such as OSPF (Open Shortest Path First), IS-IS (Intermediate System to Intermediate System protocol), and PNNI (Private Network-Network Interface).

Figure 1:
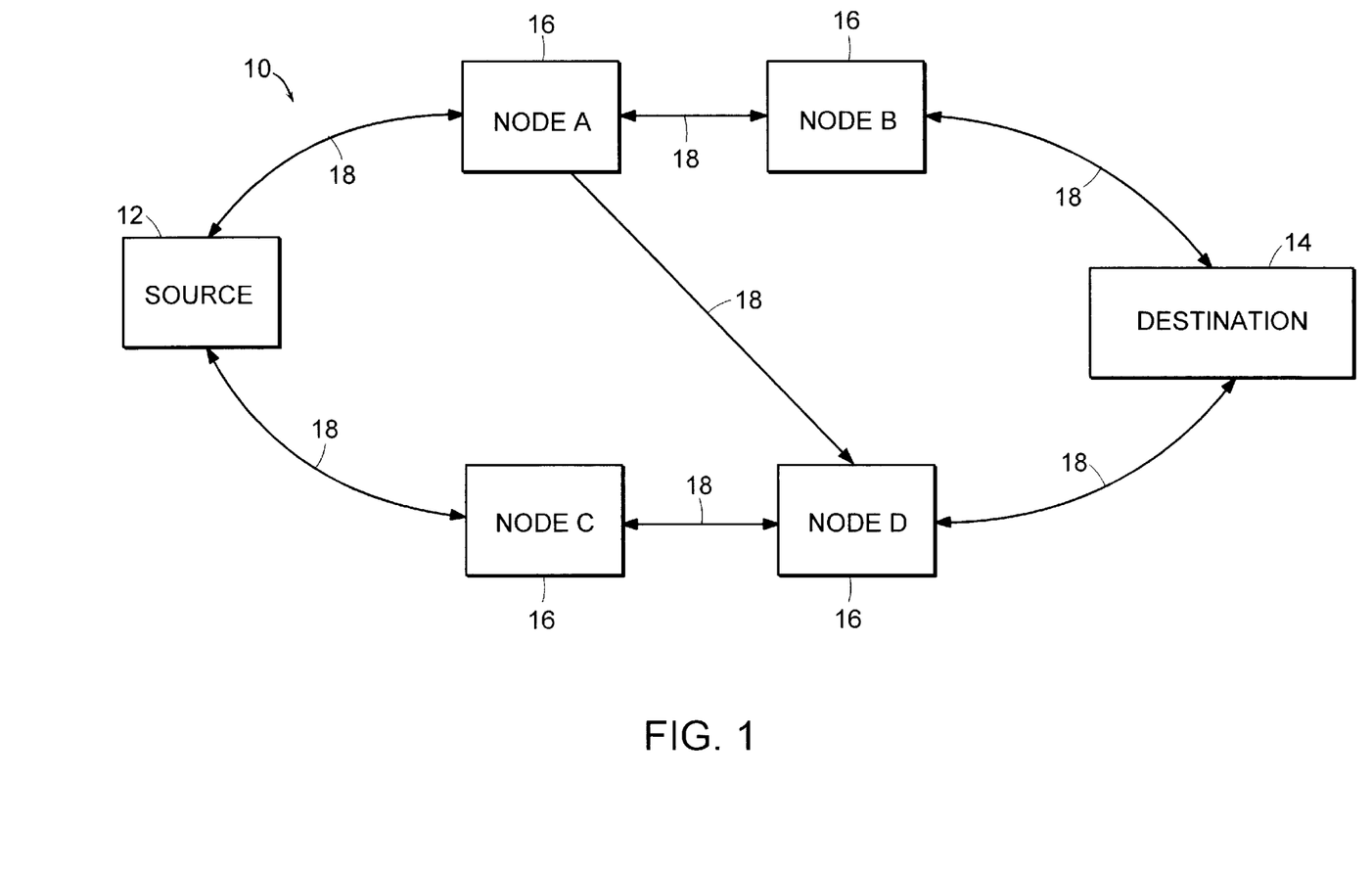
FIG. 1 schematically shows a preferred network arrangement that may be utilized to implement preferred embodiments of the invention.

FIG. 1 schematically shows a simplified network 10 that may be utilized to implement preferred embodiments of the invention. In particular, the network 10 includes a source node 12 for transmitting data, a final destination node 14 to which the data is transmitted, and a plurality of intervening nodes (identified by reference number 16 as intervening nodes A–D) between the source and destination nodes 12 and 14. Each node in the network 10 includes a coupling link 18 that has various qualities, such as available bandwidth, quality of service, latency, and other qualities known in the art. Accordingly, the network 10 includes a plurality of paths (between the source node 12 and the destination node 14) that includes various intervening nodes 16, and the links 18 between the various intervening nodes 16. For example, one path may traverse from the source node 12 to node A, node A to node B, and node B to the destination node 14. In a similar manner, another path may traverse from the source node 12 to node C, node C to node D, and node D to the destination node 14.

It should be noted that although the destination node 14 is the ultimate destination for the transmitted data, such node is considered to be the destination node 14 within the shown network only. As known in the art, the network 10 also may be coupled to another network (e.g., a network not implementing MPLS) and thus, may transmit the data to such other network from the destination node 14. In a similar manner, although the source node 12 is described as being the ultimate originator of the data to be transmitted to the destination node 14, such source node 12 may have received the data from another network.

In preferred embodiments, the nodes are switching or routing devices conventionally known in the art. For example, the nodes may be PASSPORT™ switches or VERSALAR™ routers, both of which are available from Nortel Networks Corporation of Montreal, Quebec, Canada. When utilized with MPLS, each node may itself be a part of another subnet, such as connection based subnets and connectionless based subnets. For example, each node may be a part of an ATM subnet (asynchronous transfer mode), or an IP subnet (Internet protocol). Accordingly, each node may include one or more client computer systems that couple with it to access the network 10.

Figure 2:
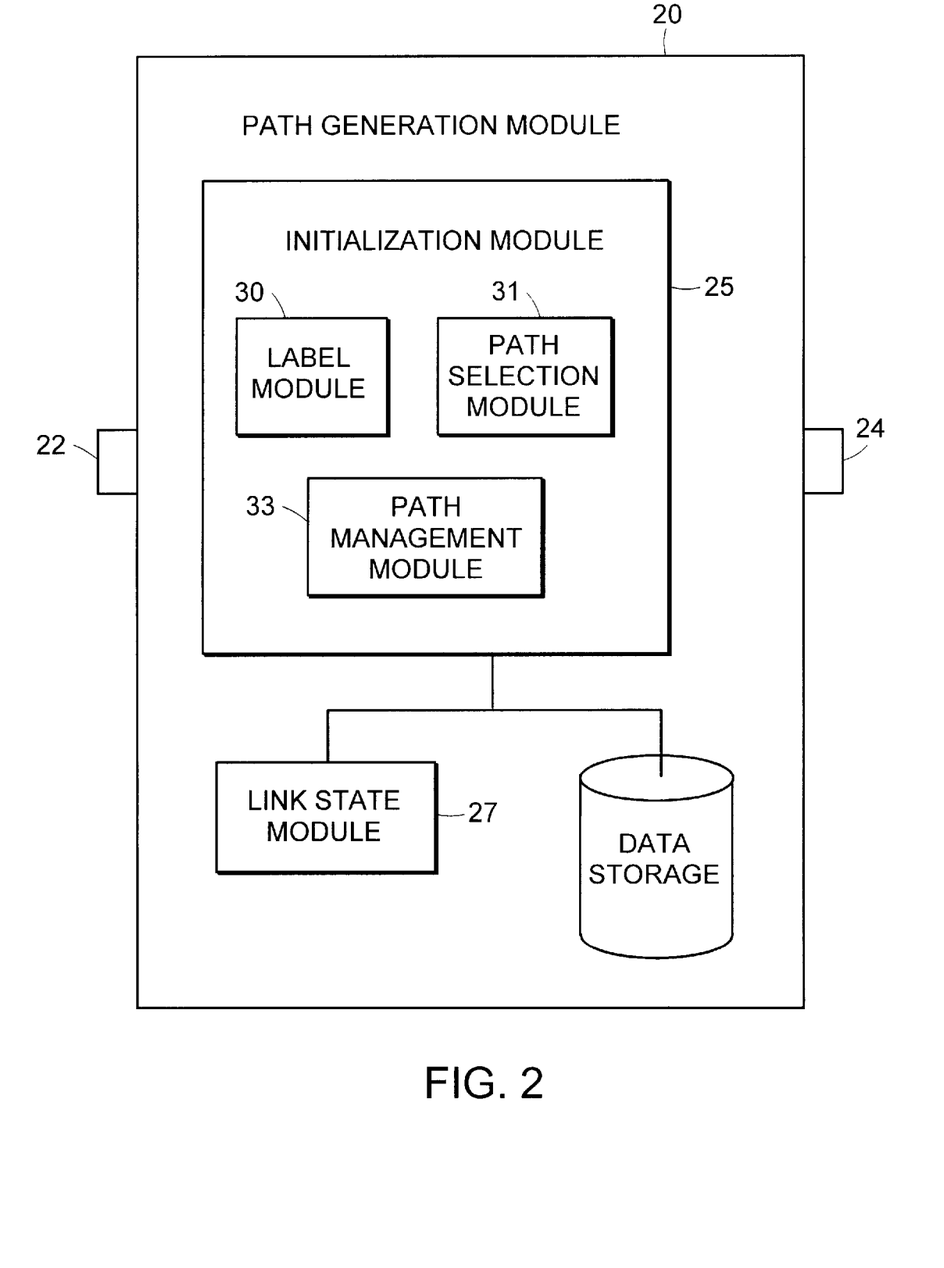
FIG. 2 schematically shows a preferred path establishment module as implemented on a source node shown in FIG. 1.

FIG. 2 schematically shows a preferred path generation module 20 as implemented on the source node 12. In particular, the path generation module 20 includes an input 22 for receiving messages (e.g., data and control messages) across the network 10, an output 24 for transmitting messages across the network 10, and a plurality of functional modules for establishing data transmission paths in accord with preferred embodiments of the invention. The plurality of functional modules includes an initialization module 25 for managing a path from the source node 12 to the destination node 14, data storage 26 (e.g., nonvolatile memory) for storing a database having path and network data, and a link state module 27 (a/k/a "updating module") that generates and manages a link state database in the data storage 26, and manages link state processes. Additional details of the path generation module 20 are discussed below with reference to FIGS. 3 and 4.

Among other things, the initialization module 25 implements various aspects of MPLS and thus, includes a label module 30 for generating and forwarding MPLS labels to the various intervening nodes 16 on a given path between the source and destination nodes 12 and 14. The initialization module also includes a path selection module 31 that selects a path from the source node 12 to the destination node 14, and a path management module 33 for building and managing paths.

Figure 3:
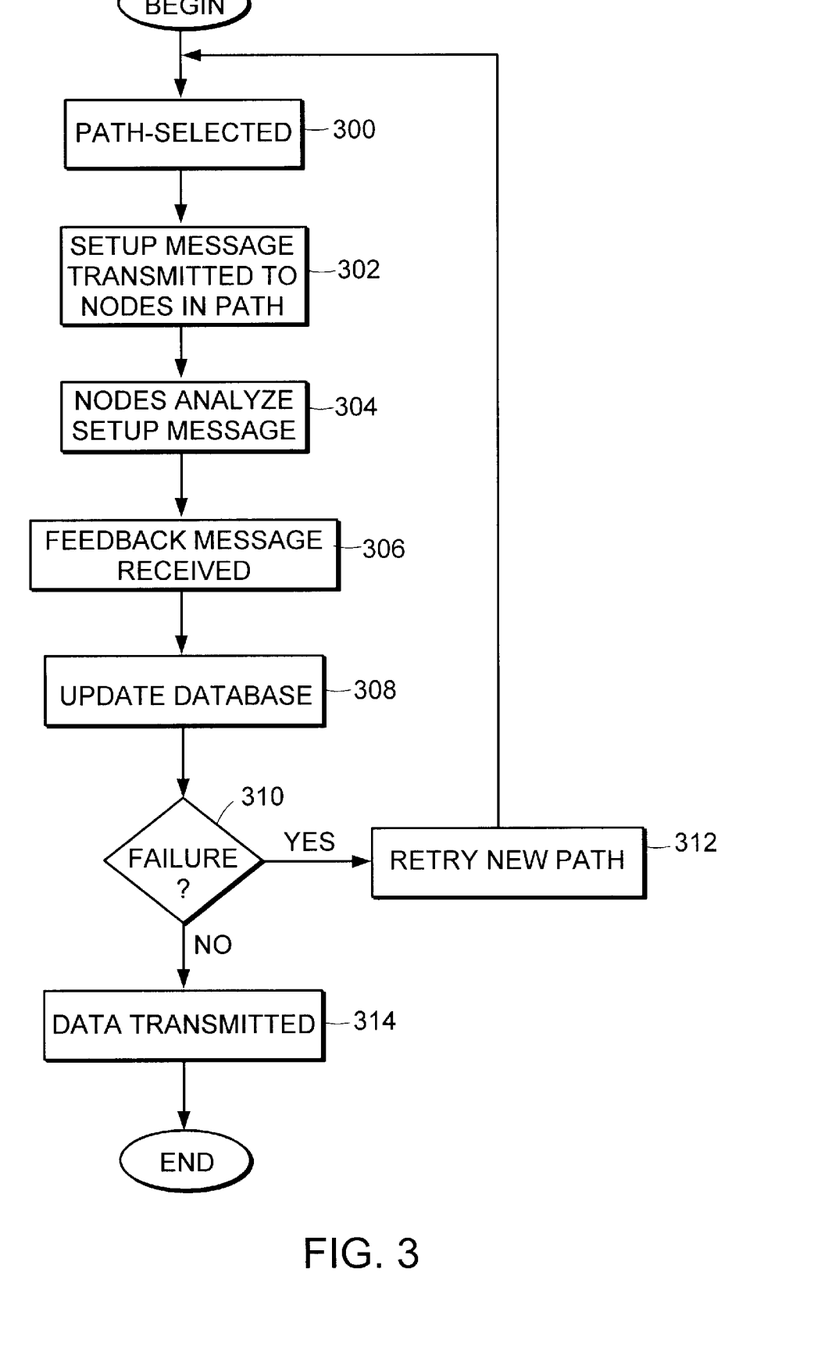
FIG. 3 shows a preferred process utilized by the path establishment module shown in FIG. 2 for establishing a data transmission path across the network from the source node to a destination node.

FIG. 3 shows a preferred process utilized by the path generation module 20 for establishing a data transmission path between the source node 12 and the destination node 14. The process begins at step 300, in which a path between the source node 12 and destination node 14 is selected by the path selection module 31 in the initialization module 25 in accord with conventional MPLS processes known in the art. Although not necessary, the selected path preferably is the shortest path of a plurality of available paths between the source and destination nodes 12 and 14 (i.e., the path with the fewest hops). For example, such path may be the path described above that traverses across intervening nodes A and B.

After the path is selected, the process then continues to step 302, in which the initialization module 25 generates a setup message having required link parameters including, among other things, a minimum amount of bandwidth permitted within a link 18 between any two intervening nodes 16 in the network 10, and a label conventionally utilized in MPLS networks. The label may be generated by the label module 30 in accord with conventional MPLS processes, while the minimum bandwidth may be generated by the path management module 33 based upon any number of variables, including the type of data being transmitted. For example, high priority data may require a relatively high minimum bandwidth to ensure that such data is reliably transmitted to the destination node 14. Other data in a setup message may include the addresses of the source and destination nodes 12 and 14, and node addresses that map to the MPLS label. Once generated, the setup message is transmitted to the nodes along the selected path. In preferred embodiments, the setup message is a control plane message.

The setup message preferably is transmitted to each node in a serial manner that permits each intervening node 16 to analyze the data within the setup message, determine if its link 18 satisfies the parameters in the setup message, and then forward the setup message to the next node in the selected path if the parameters are satisfied (step 304). As discussed in greater detail with reference to FIG. 4, an intervening node 16 that determines that its link 18 does not satisfy the parameters in the setup message responsively generates a point-to-point feedback message to the source node 12. The feedback message includes data identifying a node, its link 18, and data indicating the unsatisfactory condition not met by such intervening node's link 18. It should be noted that the term "point-to-point" is used herein in the conventional manner to indicate that a message is transmitted from one node to another node and thus, is not a broadcast message. Accordingly, the feedback message does not flood the network 10, and other networks coupled with the shown network 10.

The process then continues to step 306, in which a feedback message is received by the source node 12. The feedback message may be either a negative feedback message (described above) indicating that a link 18 in the selected path does not meet the parameters in the setup message (e.g., not enough bandwidth), or a positive feedback message generated and transmitted by the destination node 14 indicating that the selected path has been fully established, and that such node is ready to receive data transmissions from the source node 12 via the selected path. As noted above, details relating to the processes utilized by the intervening nodes 16 for generating the negative feedback messages are described below with reference to FIG. 4.

Once the feedback message is received, it is parsed by the link state module 27 to determine the required topology data for the network 10. Such data may include link and node data, available bandwidth through the link(s) 18, and whether the selected path is to be used to transmit data. Accordingly, such data is utilized by the link state module 27 to update the database in the data storage 26 in accord with conventional processes (step 308). In preferred embodiments, however, only the source node database is updated and thus, is out of synchronization with the topology databases in the other nodes in the network 10. Although not "in sync" with the other topology databases, the source node database is more up-to-date than the topology databases in other nodes in the network. The source node 12 may utilize this updated data for selecting another path to the destination node 14 (noted below), or for utilizing the network 10 for any other purpose.

Upon receipt of a link state advertisement ("LSA"), however, the link state module 27 overwrites the data in the database, thus preserving the integrity of the MPLS network. Accordingly, upon adding LSA data to the database, the source node 12 is synchronized with the other nodes in the network 10. In alternative embodiments, one or more of the various intervening nodes 16 in the selected path also update their local routing databases with data from the feedback messages.

It then is determined at step 310 if the feedback message is a negative feedback message, therefore indicating a link failure, or a resource limitation (e.g., not enough labels or bandwidth) somewhere along the selected path. If determined to be a negative feedback message, then the process continues to step 312 in which the process repeats, thus looping back to step 300, in which another path is selected for attempting to transmit the desired data. Conversely, if the feedback message is a positive feedback message, then the process continues to step 314, in which the path is established, and data is transmitted from the source node 12 to the destination node 14 along the established path. Accordingly, although a path is initialized at steps 300 and 302, the use of such path is dependent upon the information in the feedback message.

In alternative embodiments, positive feedback messages are not transmitted to the source node 12. The source node 12, in this case, may transmit the data upon expiration of a time interval, or upon receipt of some other message.

In preferred embodiments, the process shown in FIG. 3 is executed when a client coupled with the source node 12 attempts to access the destination node 14. Another client coupled with the source node 12 thus also may utilize the updated topology data in the database on the source node 12 to access the destination node.

Figure 4:
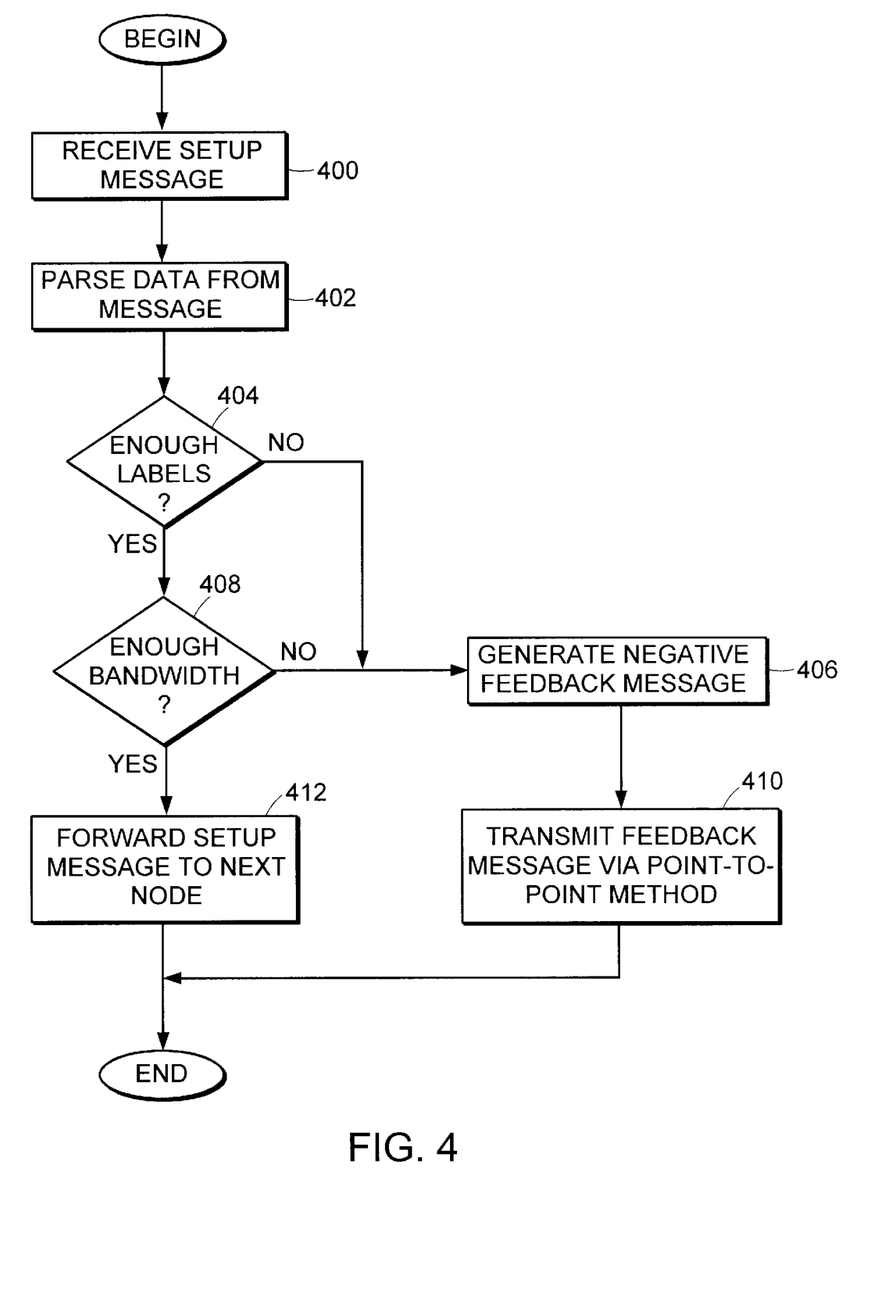
FIG. 4 shows a preferred process utilized by an intervening node for generating and then transmitting a negative feedback message to the source node.

FIG. 4 shows a preferred process utilized by an intervening node 16 for generating and then transmitting a feedback message (if necessary) to the source node 12. The process begins at step 400 in which the setup message is received by the intervening node 16. Once received, the parameter data is parsed from the message (step 402). In preferred embodiments, among other things, label data and bandwidth data are parsed and compared to existing resources. To that end, the label data is matched with node identifiers in the routing database to determine which links and nodes are to be examined. For example, the label data may be used to determine the next node in the path and accompanying links coupled with the next node.

It thus is determined at step 404 if enough labels exist for establishing the selected path, and if enough label exist, if enough bandwidth across the link 18 is available for one more label. In particular, as is known in the art, each intervening node 16 has enough resources for a selected maximum number of MPLS paths, each of which is identified by a label. Accordingly, the intervening node 16 determines if it has enough resources for one more label (i.e., one more path). If not, then the process continues to step 406 in which a negative feedback message is generated. Generation of the negative feedback message effectively prevents the intervening node 16 from forwarding the setup message to the next node in the path. Accordingly, the other nodes in the path are not required to process the setup message since such other nodes are not to be utilized to transmit the desired data message. In preferred embodiments, the negative feedback message is "piggybacked" onto conventional MPLS messages that are transmitted to the source node 12. Such messages may include a well known MPLS notification message, which indicates a failure in the node 16 and/or link 18. In alternative embodiments, the negative feedback message is a self-contained, point-to-point message transmitted directly to the source node 12.

Once the negative feedback message is generated, the process continues to step 410, in which the negative feedback message is transmitted in a point-to-point data transmission to the source node 12. In preferred embodiments, the negative feedback message is transmitted via the intervening nodes 16 (if any). In alternative embodiments, the negative feedback message is transmitted to the source node 12 via non-intervening network devices.

Returning to step 404, if it is determined that the intervening node 16 has resources for one more label, then the process continues to step 408, in which it is determined if the link 18 coupled between the intervening node 16 and the next node in the path has at least the amount of available bandwidth as required in the setup message. If the link 18 does not have enough bandwidth, then, in a manner similar to a negative response to the query in step 404, the process continues to step 406, in which a negative feedback message is generated, and step 410, in which the feedback message is transmitted. If, however, at step 408 it is determined that the link 18 does have enough available bandwidth, then the process continues to step 410, in which the setup message is forwarded to the next node in the selected path.

It should be noted that although preferred embodiments are discussed primarily with reference to whether a link 18 has enough available bandwidth, various other embodiments may be implemented to establish a path across a link state routing network based upon other qualities of the links 18 in the path. For example, specific latency requirements may be considered instead of, or in addition to, available bandwidth when determining whether a selected path can be utilized. Discussion of available bandwidth therefore is exemplary and not intended to limit preferred embodiments of the invention. In addition, various steps of the discussed processes may be executed concurrently, or in a different order than that shown.

Accordingly, use of the preferred apparatus and method permits the source node 12 to establish alternate paths to the destination node 14 without requiring data from an LSA. Moreover, the preferred apparatus and method may be utilized with a link state routing network without interfering with the normal operation of the underlying routing processes. Specifically, although the source node 12 may not be synchronized with the other nodes, receipt of an LSA synchronizes the source database with the other node databases.

As suggested above, preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits or digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of forwarding a first message from a source to a destination via a link state routing network, wherein the source and destination are nodes coupled by at least one intervening node, each node having associated link coupling characteristics, the method comprising:

initializing a first path from the source to the destination via the link state routing network, including transmitting desired link coupling characteristics for the first path to each node in the first path;

receiving a feedback message relating to the first path, the feedback message including data relating to a quality of the first path relative to the desired link coupling characteristics of the first path, the feedback message being a point-to-point message forwarded to the source;

initializing a second path from the source to the destination in response to receipt of the feedback message by the source; and forwarding the first message to the destination via the second path.

2. The method as defined by claim 1 wherein the data relating to the quality of the first path includes data relating to available bandwidth in the first path.

3. The method as defined by claim 1 wherein the data relating to the quality of the first path includes data relating to the quality of service in the first path.

4. The method as defined by claim 1 wherein the first path includes a plurality of nodes, the feedback message being a non-broadcast message.

5. The method as defined by claim 4 wherein each of the plurality of nodes that forward the feedback message forward it toward no network devices other than the source or other network devices that are configured to forward the feedback message toward the source.

6. The method as defined by claim 4 wherein the feedback message is received from one of the plurality of nodes.

7. The method as defined by claim 1 wherein the source includes a database for maintaining network information, the method further comprising:

the source updating the database in response to receipt of the feedback message, the source database being out of synchronization with other nodes in the network.

8. The method as defined by claim 1 wherein the link state routing network produces broadcast advertisements, the method further comprising:

the source storing the data in the feedback message in a local data storage;

the source receiving a broadcast advertisement having advertisement data; and the source overwriting the stored data from the feedback message in the local data storage with the advertisement data in the broadcast advertisement.

9. The method as defined by claim 1 wherein the act of initializing the first path comprises:

forwarding label information to a plurality of nodes that are to forward the first message from the source to the destination.

10. The method as defined by claim 1 wherein the first message is forwarded from the source to the destination across both connectionless oriented and connection oriented networks.

11. The method as defined by claim 1 wherein the feedback message includes failure data indicating that the bandwidth along the first path is below a preselected amount.

12. An apparatus for forwarding a first message from a source to a destination via a link state routing network, the apparatus comprising:

an initialization module that initializes a first path from the source to the destination via the link state routing network;

an input operatively coupled with the initialization module, the input receiving a feedback message relating to the first path, the feedback message including data relating to a quality of the first path, the feedback message being a point-to-point message forwarded to the source, the initialization module initializing a second path from the source to the destination in response to receipt of the feedback message by the source; and an output that forwards the first message to the destination via the second path.

13. The apparatus as defined by claim 12 wherein the data relating to the quality of the first path includes data relating to available bandwidth in the first path.

14. The apparatus as defined by claim 12 wherein the data relating to the quality of the first path includes data relating to the quality of service in the first path.

15. The apparatus as defined by claim 12 wherein the first path includes a plurality of nodes, the feedback message being a non-broadcast message.

16. The apparatus as defined by claim 15 wherein each of the plurality of nodes that forward the feedback message forward it toward no network devices other than the source or other network devices that are configured to forward the feedback message toward the source.

17. The apparatus as defined by claim 15 wherein the feedback message is received from one of the plurality of nodes.

18. The apparatus as defined by claim 12 wherein the source includes a database for maintaining network information, the apparatus further comprising:

an updating module that updates the database in response to receipt of the feedback message, the database being out of synchronization with other nodes in the network.

19. The apparatus as defined by claim 12 wherein the link state routing network produces broadcast advertisements, the apparatus further comprising:

local data storage that stores the data in the feedback message, the input receiving a broadcast advertisement having advertisement data; and an updating module operatively coupled with the local data storage, the updating module overwriting the stored data from the feedback message in the local data storage with the advertisement data in the broadcast advertisement.

20. The apparatus as defined by claim 12 wherein the initialization module comprises:

a label module that forwards label information to a plurality of nodes that are to forward the first message from the source to the destination.

21. The apparatus as defined by claim 12 wherein the first message is forwarded from the source to the destination across both connectionless oriented and connection oriented networks.

22. The apparatus as defined by claim 12 wherein the feedback message includes failure data indicating that the bandwidth along the first path is below a preselected amount.

23. An apparatus for forwarding a first message from a source to a destination via a link state routing network, wherein the source and destination are nodes coupled by at least one intervening node, each node having associated link coupling characteristics the apparatus comprising:

means for initializing a first path from the source to the destination via the link state routing network, including transmitting desired link coupling characteristics for the first path to each node in the first path;

means for receiving a feedback message relating to the first path, the feedback message including data relating to a quality of the first path relative to the desired link coupling characteristics of the first path, the feedback message being a point-to-point message forwarded to the source;

means for initializing a second path from the source to the destination in response to receipt of the feedback message by the source; and means for forwarding the first message to the destination via the second path.

24. The apparatus as defined by claim 23 wherein the data relating to the quality of the first path includes data relating to available bandwidth in the first path.

25. The apparatus as defined by claim 23 wherein the data relating to the quality of the first path includes data relating to the quality of service in the first path.

26. The apparatus as defined by claim 23 wherein the first path includes a plurality of nodes, the feedback message being a non-broadcast message.

27. The apparatus as defined by claim 26 wherein each of the plurality of nodes that forward the feedback message forward it toward no network devices other than the source or other network devices that are configured to forward the feedback message toward the source.

28. The apparatus as defined by claim 26 wherein the feedback message is received from one of the plurality of nodes.

29. The apparatus as defined by claim 23 wherein the source includes a database for maintaining network information, the method further comprising:

means for updating the database in response to receipt of the feedback message, the source database being out of synchronization with other nodes in the network.

30. The apparatus as defined by claim 23 wherein the link state routing network produces broadcast advertisements, the apparatus further comprising:

means for storing the data in the feedback message in a local data storage;

means for receiving a broadcast advertisement having advertisement data; and means for overwriting the stored data from the feedback message in the local data storage with the advertisement data in the broadcast advertisement.

31. The apparatus as defined by claim 23 wherein the means for initializing the first path comprises:

means for forwarding label information to a plurality of nodes that are to forward the first message from the source to the destination.

32. The apparatus as defined by claim 23 wherein the first message is forwarded from the source to the destination across both connectionless oriented and connection oriented networks.

33. The apparatus as defined by claim 23 wherein the feedback message includes failure data indicating that the bandwidth along the first path is below a preselected amount.

34. A computer program product for use on a computer system for forwarding a first message from a source to a destination via a link state routing network, wherein the source and destination are nodes coupled by at least one intervening node, each node having associated link coupling characteristics, the computer program product comprising a computer usable medium having computer readable program code thereon, the computer readable program code including:

program code for initializing a first path from the source to the destination via the link state routing network, including transmitting desired link coupling characteristics for the first path to each node in the first path;

program code for receiving a feedback message relating to the first path, the feedback message including data relating to a quality of the first path relative to the desired link coupling characteristics of the first path, the feedback message being a point-to-point message forwarded to the source;

program code for initializing a second path from the source to the destination in response to receipt of the feedback message by the source; and program code for forwarding the first message to the destination via the second path.

35. The computer program product as defined by claim 34 wherein the data relating to the quality of the first path includes data relating to available bandwidth in the first path.

36. The computer program product as defined by claim 34 wherein the data relating to the quality of the first path includes data relating to the quality of service in the first path.

37. The computer program product as defined by claim 34 wherein the first path includes a plurality of nodes, the feedback message being a non-broadcast message.

38. The computer program product as defined by claim 37 wherein each of the plurality of nodes that forward the feedback message forward it toward no network devices other than the source or other network devices that are configured to forward the feedback message toward the source.

39. The computer program product as defined by claim 37 wherein the feedback message is received from one of the plurality of nodes.

40. The computer program product as defined by claim 34 wherein the source includes a database for maintaining network information, the computer program product further comprising:

program code for updating the database in response to receipt of the feedback message, the source database being out of synchronization with other nodes in the network.

41. The computer program product as defined by claim 34 wherein the link state routing network produces broadcast advertisements, the computer program product further comprising:

program code for storing the data in the feedback message in a local data storage;

program code for receiving a broadcast advertisement having advertisement data; and program code for overwriting the stored data from the feedback message in the local data storage with the advertisement data in the broadcast advertisement.

42. The computer program product as defined by claim 34 wherein the program code for initializing the first path comprises:

program code for forwarding label information to a plurality of nodes that are to forward the first message from the source to the destination.

43. The computer program product as defined by claim 34 wherein the first message is forwarded from the source to the destination across both connectionless oriented and connection oriented networks.

44. The computer program product as defined by claim 34 wherein the feedback message includes failure data indicating that the bandwidth along the first path is below a preselected amount.

45. The method of forwarding a first message from a source to a destination via a link state routing network, the link state routing network utilizing broadcast advertisements to notify network devices of congestion in the link state routing network, the method comprising:

initializing a first path from the destination to the source;

setting a minimum bandwidth for the first message to be forwarded through the first path;

forwarding the minimum bandwidth to each one of a plurality of nodes in the first path;

the source receiving a feedback message having data indicating that at least one of the nodes in the plurality of nodes in the first path has a bandwidth that is below the minimum bandwidth, the feedback message being a point-to-point message forwarded toward the source;

in response to receipt of the feedback message, initializing a second path from the destination to the source; and forwarding the first message to the destination via the second path.

46. The method as defined by claim 45 wherein the feedback message is received from the at least one of the nodes in the plurality of nodes.

47. The method as defined by claim 45 wherein the source includes a database, the method further comprising:

the source updating the database in response to receipt of the feedback message, the source database being out of synchronization with other nodes in the network.

48. The method as defined by claim 45 further comprising:

the source storing the data in the feedback message in a local data storage;

the source receiving a broadcast advertisement having advertisement data; and the source overwriting the stored data from the feedback message in the local data storage with the advertisement data in the broadcast advertisement.

49. The method as defined by claim 45 wherein the act of initializing the first path comprises:

forwarding label information to a plurality of nodes that are to forward the first message from the source to the destination.

50. The method as defined by claim 45 wherein the first message is forwarded from the source to the destination across both connectionless-oriented and connection-oriented networks.

51. The method as defined by claim 45 wherein the link state routing network implements MPLS.

52. An apparatus for forwarding a first message from a source to a destination via a link state routing network, the link state routing network utilizing broadcast advertisements to notify network devices of congestion in the link state routing network, the apparatus comprising:

an initialization module that initializes a first path from the destination to the source, the initialization module setting a minimum bandwidth for the first message to be forwarded through the first path, and transmitting the minimum bandwidth to each of a plurality of nodes comprising the first path;

an input that receives a feedback message having data indicating that at least one of the node in the plurality of nodes comprising the first path has a bandwidth that is below the minimum bandwidth, the feedback message being a point-to-point message forwarded toward the source, the initialization module initializing a second path from the destination to the source in response to receipt of the feedback message; and an output that forwards the first message to the destination via the second path.

53. The apparatus as defined by claim 52 wherein the feedback message is received from the at least one of the plurality of nodes.

54. The apparatus as defined by claim 52 wherein the source includes a database, the apparatus further comprising:

an updating module that updates the database in response to receipt of the feedback message, the database being out of synchronization with other nodes in the network.

55. The apparatus as defined by claim 52 further comprising:

local data storage that stores the data in the feedback message, the input receiving a broadcast advertisement having advertisement data; and an updating module operatively coupled with the local data storage, the updating module overwriting the stored data from the feedback message in the local data storage with the advertisement data in the broadcast advertisement.

56. The apparatus as defined by claim 52 wherein the initialization module comprises:

a label module that forwards label information to a plurality of nodes that are to forward the first message from the source to the destination.

57. The apparatus as defined by claim 52 wherein the first message is forwarded from the source to the destination across both connectionless-oriented and connection-oriented networks.

58. The apparatus as defined by claim 52 wherein the link state routing network implements MPLS.

59. A computer program product for use on a computer system for forwarding a first message from a source to a destination via a link state routing network, the link state routing network utilizing broadcast advertisements to notify network devices of congestion in the link state routing network, the computer program product comprising a computer readable medium having computer readable program code thereon, the computer readable program code including:

program code for initializing a first path from the destination to the source;

program code for setting a minimum bandwidth for the first message to be forwarded through the first path, including program code for forwarding the minimum bandwidth for the first message to each of a plurality of nodes comprising the first path;

program code for receiving a feedback message having data indicating that at least one of the nodes of the plurality of nodes comprising the first path has a bandwidth that is below the minimum bandwidth, the feedback message being a point-to-point message forwarded toward the source;

program code for initializing a second path from the destination to the source in response to receipt of the feedback message; and program code for forwarding the first message to the destination via the second path.

60. The computer program product as defined by claim 59 wherein the feedback message is received from the at least one of the plurality of nodes.

61. The computer program product as defined by claim 59 wherein the source includes a database, the computer program product further comprising:

program code for permitting the source to update the database in response to receipt of the feedback message, the source database being out of synchronization with other nodes in the network.

62. The computer program product as defined by claim 59 further comprising:

program code for storing the data in the feedback message in a local data storage;

program code for receiving a broadcast advertisement having advertisement data; and program code for overwriting the stored data from the feedback message in the local data storage with the advertisement data in the broadcast advertisement.

63. The computer program product as defined by claim 59 wherein the program code for initializing the first path comprises:

program code for forwarding label information to a plurality of nodes that are to forward the first message from the source to the destination.

64. The computer program product as defined by claim 59 wherein the first message is forwarded From the source to the destination across both connectionless-oriented and connection-oriented networks.

* * * * *